United States Patent
Ikeda

(10) Patent No.: US 8,626,423 B2
(45) Date of Patent: Jan. 7, 2014

(54) CONTROL DEVICE FOR INTERNAL COMBUSTION ENGINE

(71) Applicant: Imagineering, Inc., Kobe (JP)

(72) Inventor: Yuji Ikeda, Kobe (JP)

(73) Assignee: Imagineering, Inc., Kobe-shi, Hyogo (JP)

( * ) Notice: Subject to any disclaimer, the term of this patent is extended or adjusted under 35 U.S.C. 154(b) by 0 days.

(21) Appl. No.: 13/692,271

(22) Filed: Dec. 3, 2012

(65) Prior Publication Data

US 2013/0096803 A1  Apr. 18, 2013

Related U.S. Application Data

(63) Continuation of application No. PCT/JP2011/062701, filed on Jun. 2, 2011.

(30) Foreign Application Priority Data

Jun. 2, 2010  (JP) ................. 2010-126695

(51) Int. Cl.
*F02P 23/04* (2006.01)
*F02P 3/01* (2006.01)
*H05H 1/00* (2006.01)

(52) U.S. Cl.
USPC ........................................................ 701/103

(58) Field of Classification Search
USPC ............... 701/103, 104, 105, 102, 101, 115; 123/406.12, 406.3, 594; 315/111.21
See application file for complete search history.

(56) References Cited

U.S. PATENT DOCUMENTS

| 2009/0031988 A1 | 2/2009 | Shiraishi et al. |
| 2010/0186670 A1 | 7/2010 | Ikeda |

FOREIGN PATENT DOCUMENTS

| JP | 2009-036125 A | 2/2009 | |
| JP | 2009-038025 A | 2/2009 | |
| JP | 2010-116802 A | 5/2010 | |
| JP | 2010138720 A * | 6/2010 | ............... F02P 3/01 |

OTHER PUBLICATIONS

International Search Report of PCT/JP2011/062701, mailing date of Aug. 9, 2011.

* cited by examiner

*Primary Examiner* — Hieu T Vo
(74) *Attorney, Agent, or Firm* — Westerman, Hattori, Daniels & Adrian, LLP

(57) ABSTRACT

To provide a control device for an internal combustion engine that can optimally control a plasma ignition operation independent of fuel type. In a control device 30 of an internal combustion engine 20, which controls plasma ignition operation for causing volume ignition of air fuel mixture by plasma in a combustion chamber 10, a fuel type detection part 40 detects a type of fuel to be supplied to the combustion chamber 10. According to the detected fuel type, a state of plasma or a state of air fuel mixture in the combustion chamber 10 is controlled.

7 Claims, 2 Drawing Sheets

CONTROL DEVICE FOR INTERNAL COMBUSTION ENGINE

TECHNICAL FIELD

The present invention relates to a control device for an internal combustion engine, which controls a plasma ignition operation for causing volume ignition of air fuel mixture by plasma in a combustion chamber of the internal combustion engine.

BACKGROUND OF THE INVENTION

Conventionally, there is known an ignition technology for causing volume ignition of air fuel mixture by plasma in a combustion chamber of an internal combustion engine. For example, Patent Document 1 discloses an internal combustion engine to which a technology of this kind is applied.

More particularly, in the internal combustion engine of Patent Document 1, a spark discharge is generated in a discharge gap of a spark plug, and a microwave is radiated toward the discharge gap. The microwave pulses supply energy to plasma generated at the discharge gap. As a result thereof, electrons in the plasma region are accelerated, the plasma expands, and air fuel mixture is ignited in volume.

PATENT DOCUMENTS

Patent Document 1: Japanese Unexamined Patent Application, Publication No. 2009-38025

SUMMARY OF THE INVENTION

In a plasma ignition operation for causing volume ignition of air fuel mixture by plasma in a combustion chamber, an air fuel ratio of flammability limit (hereinafter, referred to as a "lean limit") of the air fuel mixture increases, compared to a case in which air fuel mixture is ignited by, for example, spark discharge alone. In the plasma ignition, stronger plasma is generated compared to discharge plasma generated accompanied with the spark discharge.

The inventor of the present invention has found that, in the plasma ignition operation, improvement of the lean limit differs depending on fuel type. This means that variation in lean limit differs depending on fuel type in a case of volume ignition of air fuel mixture by plasma, contrary to a case of point ignition of air fuel mixture. Prior art internal combustion engines are not operable with various types of fuel. This means that the prior art internal combustion engines may not be able to maintain an adequate air fuel ratio of air fuel mixture during the plasma ignition operation, depending on the fuel.

The present invention has been made in view of the above described problems, and it is an object of the present invention to provide a control device for an internal combustion engine, which can optimally control the plasma ignition operation independent of fuel type.

In accordance with a first aspect of the present invention, there is provided a control device for an internal combustion engine, which controls a plasma ignition operation for causing volume ignition of air fuel mixture by plasma in a combustion chamber of the internal combustion engine. The control device for the internal combustion engine is provided with a fuel type detection unit that detects a type of fuel to be supplied to the combustion chamber, and, during the plasma ignition operation, according to the detected fuel type that has been detected by the fuel type detection unit, adjusts a state of the plasma or a state of the air fuel mixture in the combustion chamber.

According to the first aspect of the present invention, the type of the fuel to be supplied to the combustion chamber is detected, and, according to the detected fuel type, the state of the plasma or the state of the air fuel mixture in the combustion chamber is adjusted.

In accordance with a second aspect of the present invention, in addition to the feature of the first aspect of the present invention, an air fuel ratio control unit is provided that controls air fuel ratio of the air fuel mixture in the combustion chamber according to the detected fuel type during the plasma ignition operation.

According to the second aspect of the present invention, during the plasma ignition operation, the air fuel ratio of the air fuel mixture in the combustion chamber is controlled according to the detected fuel type. By controlling the air fuel ratio of the air fuel mixture in the combustion chamber, the state of the air fuel mixture in the combustion chamber is adjusted. In the case of volume ignition of the air fuel mixture by plasma, as described above, improvement of lean limit differs depending on fuel type. A range of air fuel ratio in which the air fuel mixture can be stably ignited differs depending on fuel type. According to the second aspect of the present invention, based on these findings, the air fuel ratio of the air fuel mixture in the combustion chamber is controlled according to fuel type. The lean limit is defined as a value of air fuel ratio when COV (Coefficient Of Variance) becomes a predetermined value (for example, 5%). COV is defined as the standard deviation of IMEP (Indicated Mean Effective Pressure) divided by the mean value of the IMEP for each cycle.

In accordance with a third aspect of the present invention, in addition to the feature of the second aspect of the present invention, a plasma control unit is provided that, during the plasma ignition operation, changes input energy for generating the plasma based on an operation state of the internal combustion engine, and adjusts an air fuel ratio of flammability limit of air fuel mixture to a value that maximizes fuel consumption rate in the operation state. The air fuel ratio control unit controls the air fuel ratio of the air fuel mixture in the combustion chamber during the plasma ignition operation to the air fuel ratio of flammability limit of the air fuel mixture.

According to the third aspect of the present invention, during the plasma ignition operation, the input energy for plasma generation is changed based on the operation state of the internal combustion engine, and the lean limit is adjusted to a value that maximizes the fuel consumption rate in the operation state of the internal combustion engine. Then, the air fuel ratio of the air fuel mixture in the combustion chamber during the plasma ignition operation is adjusted to the lean limit that is determined by the input energy for plasma generation. Thus, the air fuel ratio of the air fuel mixture in the combustion chamber during the plasma ignition operation is adjusted to a value that maximizes the fuel consumption rate in the operation state of the internal combustion engine.

There is a certain limit to an extent of expansion of the lean limit by way of plasma. However, until the limit is reached, the lean limit becomes higher as more energy is inputted for plasma generation. Conventionally, it has not been considered as to what criteria should be used to control the input energy for plasma generation during the plasma ignition operation. Therefore, there has been concern that, with intent to expand the lean limit by way of plasma, energy is inputted in excess of that required for plasma generation. In such a case, there is concern that, even if an actual air fuel ratio of the air fuel mixture is adjusted to the lean limit, pressure is lowered due to expansion before the fuel burns out, unburned fuel increases, and the fuel consumption rate decreases.

On the other hand, according to the third aspect of the present invention, the air fuel ratio of the air fuel mixture in the combustion chamber during the plasma ignition operation is adjusted to the lean limit that is adjusted to a value that maximizes the fuel consumption rate in the operation state of the internal combustion engine. Therefore, the fuel consumption rate is optimized, and as well the input energy for plasma generation is prevented from being excessively larger than needed.

In accordance with a fourth aspect of the present invention, in addition to the feature of the first aspect of the present invention, a plasma control unit is provided that changes input energy for generating the plasma according to the detected fuel type during the plasma ignition operation.

According to the fourth aspect of the present invention, the input energy for plasma generation is changed according to the detected fuel type during the plasma ignition operation. By changing the input energy for plasma generation, states of the plasma such as energy density and size of the plasma region are adjusted. Incidentally, fuel ignitability differs depending on fuel type. If the plasma is generated with no regard to fuel type, there is a concern that the air fuel mixture is not appropriately ignited. According to the fourth aspect of the present invention, the input energy for plasma generation is changed according to the detected fuel type so that the fuel is appropriately ignited.

In accordance with a fifth aspect of the present invention, in addition to the feature of the fourth aspect of the present invention, the internal combustion engine repeatedly radiates pulse-like electromagnetic waves at a predetermined duty cycle for each ignition period in the combustion chamber, thereby generating the plasma, while the plasma control unit changes the duty cycle according to the detected fuel type.

According to the fifth aspect of the present invention, the plasma control unit changes, according to the detected fuel type, the input energy for generating the electromagnetic wave pulses to be repeatedly outputted. As the duty cycle increases, the input energy for plasma generation increases.

In accordance with a sixth aspect of the present invention, in addition to the feature of one of the first to fifth aspects of the present invention, the fuel type detection unit detects fuels identical in principal components but different in water content ratio as different types of fuels.

According to the sixth aspect of the present invention, the fuel type detection unit treats fuels identical in principal components but different in water content ratio as different types of fuels. For example, in a case of hydrous ethanol, the fuel type detection unit detects hydrous ethanol having water content ratio of 10% and hydrous ethanol having water content ratio of 20% as different types of fuels. Therefore, the state of the plasma or the state of the air fuel mixture in the combustion chamber is adjusted according to the water content ratio of the ethanol during the plasma ignition operation.

In accordance with a seventh aspect of the present invention, there is provided a control device for an internal combustion engine, which controls a plasma ignition operation for causing volume ignition of air fuel mixture by plasma in a combustion chamber of the internal combustion engine. The control device for the internal combustion engine is provided with a plasma control unit that changes input energy for generating the plasma based on an operation state of the internal combustion engine, thereby adjusting an air fuel ratio of flammability limit of the air fuel mixture to a value that maximizes fuel consumption rate in the operation state, during the plasma ignition operation, and an air fuel ratio control unit that controls an air fuel ratio of the air fuel mixture in the combustion chamber during the plasma ignition operation to the air fuel ratio of flammability limit, which is determined by the input energy for generating the plasma, of the air fuel mixture.

According to the seventh aspect of the present invention, similar to the third aspect of the present invention, the input energy for plasma generation is controlled so that the lean limit is adjusted to a value that maximizes the fuel consumption rate in the operation state of the internal combustion engine. And then, the air fuel ratio of the air fuel mixture in the combustion chamber during the plasma ignition operation is adjusted to the lean limit. Therefore, the fuel consumption rate is optimized, and as well the input energy for plasma generation is prevented from being excessively larger than needed.

According to the present invention, in controlling the state of the plasma or the state of the air fuel mixture in the combustion chamber, the type of fuel to be supplied to the combustion chamber is taken in consideration. Therefore, it becomes possible to optimally control the plasma ignition operation independent of fuel type.

According to the second aspect of the present invention, since, in a case of volume ignition of the air fuel mixture by plasma, a range of the air fuel ratio that allows stable ignition of the air fuel mixture differs depending on fuel type, the air fuel ratio of the air fuel mixture in the combustion chamber is controlled according to the detected fuel type. Therefore, it becomes possible to control the air fuel ratio of the air fuel mixture during the plasma ignition operation to an optimal value independent of fuel type.

According to the third and seventh aspects of the present invention, since the fuel consumption rate is used as a criterion for controlling the input energy for plasma generation, the fuel consumption rate is optimized, and as well the input energy for plasma generation is prevented from being excessively larger than needed. Therefore, it becomes possible to reduce energy consumed in the internal combustion engine. Furthermore, since the actual air fuel ratio is controlled to the lean limit, it becomes possible to suppress nitrogen oxide emission.

DETAILED DESCRIPTION OF THE INVENTION

Figure 1:
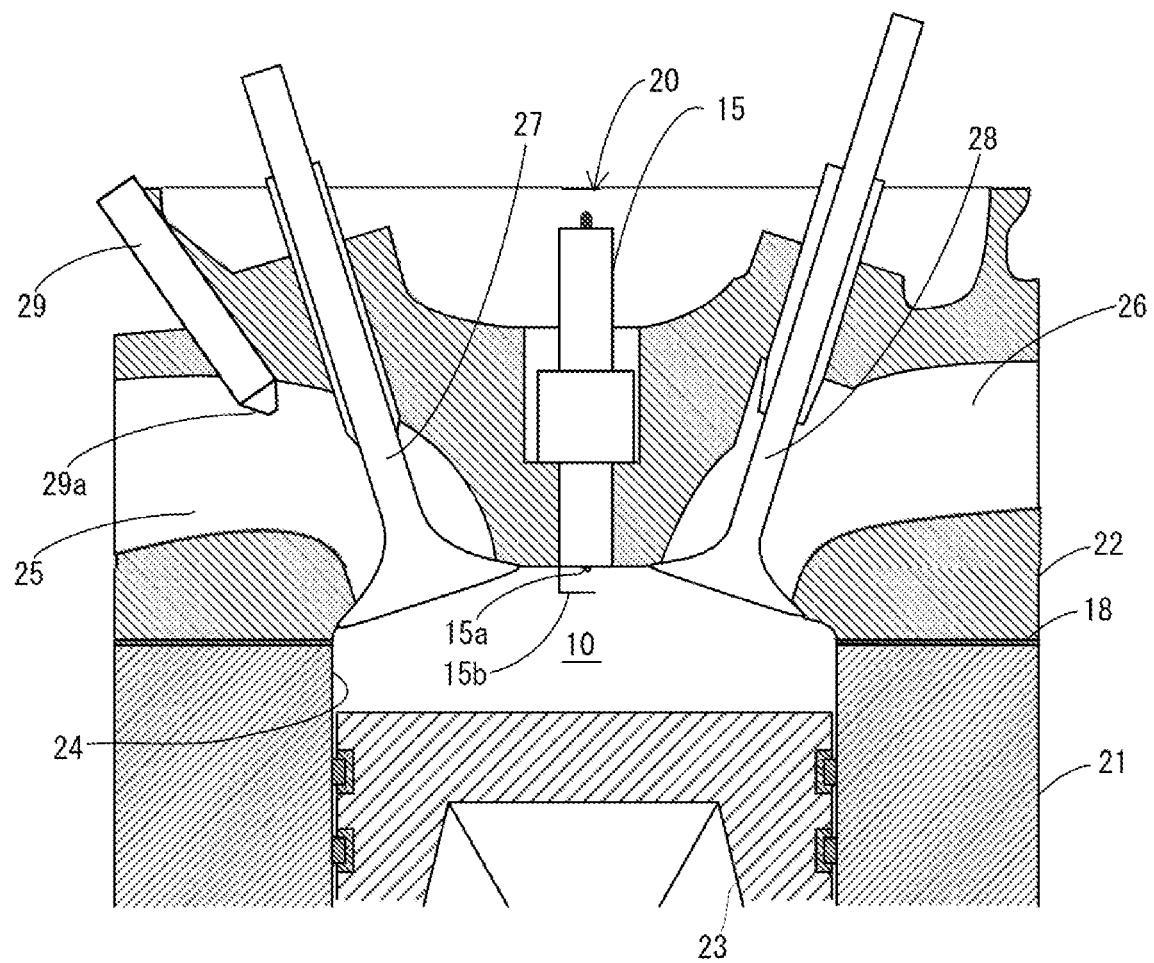
FIG. 1 is a longitudinal cross-section view of an internal combustion engine.

In the following, a detailed description will be given of the embodiment of the present invention with reference to drawings. It should be noted that the following embodiment is a mere example that is essentially preferable, and is not intended to limit the scope of the present invention, applied field thereof, or application thereof.

The present embodiment is directed to a control device 30 for an internal combustion engine 20 (hereinafter, referred to as a "control device") for causing volume ignition of air fuel mixture by plasma in a combustion chamber 10. It is to be noted that the control device 30 is merely one example of the present invention. Firstly, the internal combustion engine 20 will be described hereinafter before the control device 30 is described in detail.

Meanwhile, in the present embodiment, the air fuel mixture is ignited in volume by volume plasma (extremely thin plasma) that is stronger than discharge plasma generated by a spark discharge. The volume plasma is generated by supplying high frequency energy to the discharge plasma. In the present embodiment, a microwave in the gigahertz range is supplied to the combustion chamber 10 in synchronization with a spark discharge. However, in place of the microwave, energy of a high frequency wave in the kilohertz to megahertz range may be supplied to the combustion chamber 10. Furthermore, in a case of generating the spark discharge alone, in place of a momentary high voltage pulse, a continuous high voltage may be applied to a discharge gap of a spark plug 15, thereby generating the volume plasma. For example, following the spark discharge, electric energy accumulated in a capacitor may be supplied to the spark plug 15, thereby generating strong volume plasma. The capacitor is connected to, for example, a transmission line between an ignition coil and the spark plug 15.

Construction of Internal Combustion Engine

The internal combustion engine 20 according to the present embodiment is constituted by a plasma ignition engine, in which a piston 23 reciprocates. In the internal combustion engine 20, the spark discharge by the spark plug 15 is caused to absorb microwave energy, thereby generating non-equilibrium plasma.

As shown in FIG. 1, the internal combustion engine 20 according to the present embodiment is provided with a cylinder block 21, a cylinder head 22, and pistons 23. The cylinder block 21 is formed with a plurality of cylinders 24 having circular cross sections. It is to be noted that the number of the cylinders 24 may be one.

Inside of each cylinder 24, the piston 23 is slidably mounted. The piston 23 is connected to a crankshaft (not shown) via a conrod (connecting rod, not shown). The crankshaft is rotatably supported by the cylinder block 21. While the piston 23 reciprocates in each cylinder 24 in an axial direction of the cylinder 24, the conrod converts the reciprocation movement of the piston 23 into rotation movement of the crankshaft.

The cylinder head 22 is placed on the cylinder block 21, and a gasket 18 intervenes between the cylinder block 21 and the cylinder head 22. The cylinder head 22 partitions a combustion chamber 10 along with the cylinder 24 and the piston 23. The cylinder head 22 is formed with one or more intake ports 25 and one or more exhaust ports 26 for each cylinder 24. The intake port 25 is provided with an intake valve 27 for opening and closing the intake port 25, and an injector (fuel injection device) 29 that injects fuel. On the other hand, the exhaust port 26 is provided with an exhaust valve 28 for opening and closing the exhaust port 26.

According to the present embodiment, a nozzle 29a of the injector 29 is exposed to the intake port 25, and the fuel injected from the injector 29 is supplied to air flowing in the intake port 25. To the combustion chamber 10, air fuel mixture is introduced, in which the fuel has been mixed with the air in advance.

Figure 2:
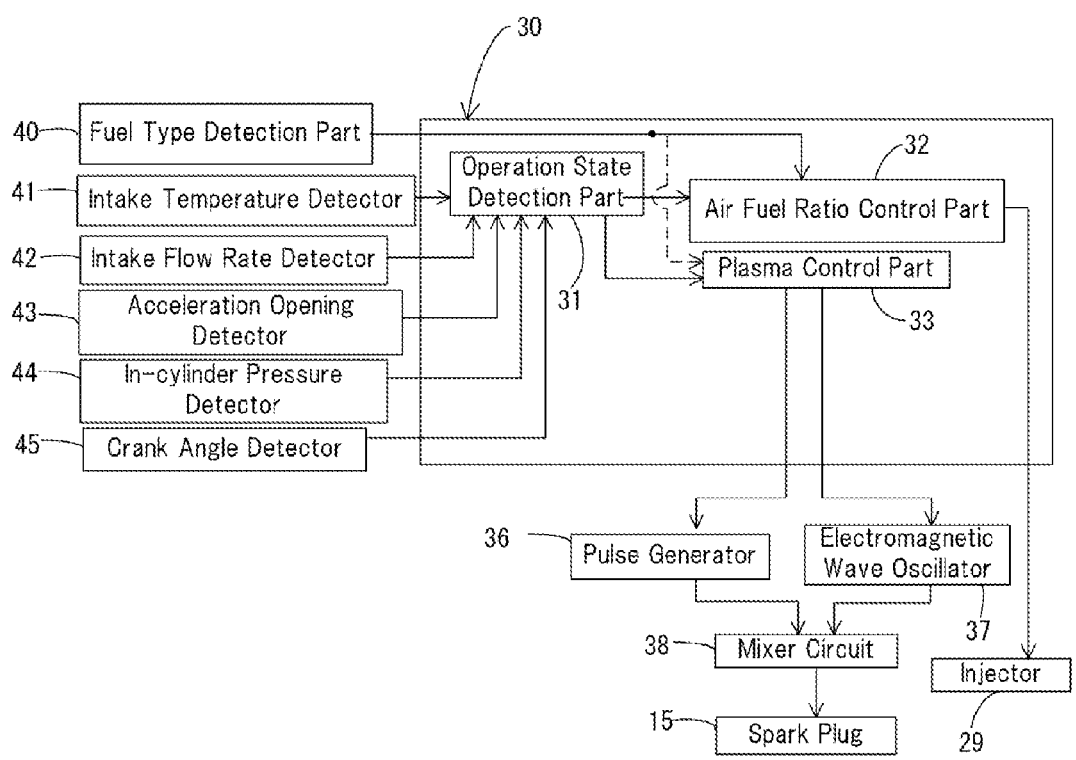
FIG. 2 is a block diagram of a control device for the internal combustion engine.

The cylinder head 22 of each cylinder 24 is provided with one spark plug 15. The spark plug 15 is fixed to the cylinder head 22. As shown in FIG. 2, a center conductor 15a of the spark plug 15 is electrically connected to a pulse generator 36 and an electromagnetic wave oscillator 37 via a mixer circuit 38 that mixes a high voltage pulse and a microwave. To the spark plug 15, the high voltage pulse outputted from the pulse generator 36 and the microwave outputted from the electromagnetic wave oscillator 37 are supplied.

The pulse generator 36 includes an ignition coil for automobiles. The electromagnetic wave oscillator 37 includes a magnetron (with oscillation frequency of 2.45 GHz) and a pulsed power supply that supplies power to the magnetron. The ignition coil and the pulsed power supply are connected to a battery (not shown).

According to the configuration described above, when a discharge signal that instructs the pulse generator 36 to output the high voltage pulse is inputted to the pulse generator 36 from the control device 30, the pulse generator 36 outputs the high voltage pulse to the mixer circuit 38. Also, when a radiation signal that instructs the electromagnetic wave oscillator 37 to oscillate the microwave is inputted to the electromagnetic wave oscillator 37 from the control device 30, the pulsed power supply supplies power to the magnetron, and the magnetron outputs the microwave to the mixer circuit 38. The high voltage pulse and the microwave are mixed by the mixer circuit 38 and supplied to the spark plug 15. As a result thereof, in the combustion chamber 10, the microwave is radiated from the discharge electrode 15a of the spark plug 15. A spark discharge occurs between a discharge electrode 15a and a ground electrode 15b of the spark plug 15 to form small scale plasma. Then, the small scale plasma is irradiated with the microwave from the discharge electrode 15a of the spark plug 15. The discharge electrode 15a of the spark plug 15 functions as an antenna for the microwave. The small scale plasma absorbs energy of the microwave and expands. The air fuel mixture in the combustion chamber 10 is ignited in volume by the expanded plasma.

The pulse generator 36, the mixer circuit 38, and the spark plug 15 constitute a discharge unit that generates plasma by way of discharge in the combustion chamber 10. The electromagnetic wave oscillator 37, the mixer circuit 38, and the spark plug 15 constitute an electromagnetic wave radiation unit that radiates the electromagnetic wave to the plasma generated by the discharge unit. The mixer circuit 38 and the spark plug 15 constitute the discharge unit and the electromagnetic wave radiation unit, at the same time.

Application of the high voltage pulse and radiation of the microwave may take place at different positions. In this case, an antenna for the microwave is provided apart from the discharge electrode 15a of the spark plug 15. The mixer circuit 38 is not necessary. The pulse generator 36 is directly connected to the discharge electrode 15a, and the electromagnetic wave oscillator 37 is directly connected to the antenna for the microwave. The antenna for the microwave may be integrated with the spark plug 15 in such a manner as to penetrate through an insulator of the spark plug 15. Also, the antenna for the microwave may be separated from the spark plug 15.

Construction of Control Device

The control device 30 according to the present embodiment includes, for example, an ECU (Electronic Control Unit) for automobiles. As shown in FIG. 2, the control device 30 includes an operation state detection part 31, a fuel type detection part 40, a plasma control part 33, and an air fuel ratio control part 32.

The fuel type detection part 40 constitutes a fuel type detection unit that detects a type of fuel to be supplied to the combustion chamber 10. The air fuel ratio control part 32 constitutes an air fuel ratio control unit that controls, according to the type of fuel (hereinafter, referred to as a "detected fuel type") that has been detected by the fuel type detection part 40, the air fuel ratio of the air fuel mixture in the combustion chamber 10 during the plasma ignition operation. The plasma control part 33 constitutes a plasma control unit that changes input energy for plasma generation (hereinafter, referred to as "plasma input energy") based on an operation state of the internal combustion engine 20, thereby adjusting the lean limit to a value that maximizes fuel consumption rate in the operation state of the internal combustion engine 20.

The operation state detection part 31 performs a detection operation of detecting respective values of a plurality of parameters representing the current operation state of the internal combustion engine 20 such as a rotation speed, a load, an accelerator opening, an intake air flow rate, and a fuel injection amount of the internal combustion engine 20. During the detection operation, an output signal of an intake temperature detector 41 that detects a temperature of intake air in the combustion chamber 10, an output signal of an intake flow rate detector 42 that detects an intake air flow rate, an output signal of an accelerator opening detector 43 that detects an accelerator opening, an output signal of an in-cylinder pressure detector 44 that detects an inner pressure of the combustion chamber 10, and an output signal of a crank angle detector 45 that detects a crank angle are used to detect the rotation speed of the internal combustion engine 20, the load of the internal combustion engine 20, the accelerator opening, the intake air flow rate, and the fuel injection amount.

The fuel type detection part 40 is mounted in a fuel tank (not shown) that stores fuel to be supplied to the combustion chamber 10. The fuel type detection part 40 measures physical quantities such as light transmission rate, relative permittivity, RME (Rapeseed Methyl Ester) density, and optical refraction index of the fuel in the fuel tank, thereby detecting the type of the fuel. The detection result of the fuel type detection part 40 is inputted to the air fuel ratio control part 32. This means that information on the type of the fuel stored in the fuel tank is inputted to the air fuel ratio control part 32.

For example, an input unit for inputting the fuel type may be provided on a control panel of a vehicle, and the fuel type detection unit detects the fuel type based on an output signal from the input unit.

The plasma control part 33 is provided with a control map for plasma for determining the plasma input energy based on the operation state of the internal combustion engine 20. In the control map for plasma, as parameters indicating the operation state of the internal combustion engine 20, the load and rotation speed of the internal combustion engine 20 are employed. The control map for plasma can be used for determining the plasma input energy that can adjust the lean limit (lean limit for a predetermined COV) to a value of the air fuel ratio that maximizes the fuel consumption rate with respect to the operation state, which is determined from the two parameters, of the internal combustion engine 20.

The lean limit increases in accordance with the increase in the plasma input energy. In the control map for plasma, compared to a first operation state, if a second operation state requires a higher air fuel ratio to maximize the fuel consumption rate, the plasma input energy for the second operation state is configured to be higher than that for the first operation state.

More particularly, in the control map for plasma, as the plasma input energy, input energy for microwave radiation per ignition period (i.e., input energy to be inputted to the magnetron to radiate the microwave for each ignition period) is determined based on the operation state of the internal combustion engine 20. In the control map for plasma, as a parameter determining the input energy for microwave radiation per ignition period, a pulse width of the microwave is determined.

The plasma control part 33 may be provided with a plurality of control maps for plasma corresponding to a plurality of fuel types. The plurality of control maps for plasma are provided for the fuel types, for which control maps for air fuel ratio, which will be described later, are provided. In this case, the fuel type detected by the fuel type detection part 40 is inputted as well to the plasma control part 33, as shown by the dashed line in FIG. 2. The plasma control part 33 changes, based on the detected fuel type, the plasma input energy during the plasma ignition operation. Therefore, compared to a case in which the fuel type is not taken in consideration, the lean limit is more precisely adjusted to a value that maximizes the fuel consumption rate in the operation state of the internal combustion engine 20.

Furthermore, the air fuel ratio control part 32 is provided with the control maps for air fuel ratio to be used for determining the air fuel ratio of the air fuel mixture in the combustion chamber 10. The control maps for air fuel ratio are provided respectively for a plurality of fuel types (for example, the following four fuel types; gasoline, methane, dry ethanol, and wet ethanol). Each control map for air fuel ratio can be used for determining the value of the air fuel ratio of the air fuel mixture, which is to be controlled to the lean limit (lean limit for a predetermined COV) that is determined by the amount of the plasma input energy. More particularly, a fuel injection amount from the injector 29, which serves as a lean limit that is determined by the amount of the plasma input energy, is read from each control map for air fuel ratio.

Operation of Control Device

The operation of the control device 30 will be described hereinafter in association with the operation of the internal combustion engine 20. In the following, a description will be given of the operation of the control device 30 for one cylinder 24.

In the plasma ignition operation, the plasma control part 33 determines, for each combustion cycle, the pulse width of the microwave based on the operation state of the internal combustion engine 20 from the control map for plasma. Also, the air fuel ratio control part 32 determines, for each combustion cycle, the fuel injection amount from the control map for air fuel ratio so that the actual air fuel ratio of the air fuel mixture serves as the lean limit that is determined by the pulse width of the microwave.

In the internal combustion engine 20 during the plasma ignition operation, the intake valve 27 is open immediately before the piston 23 reaches the top dead center, and the intake stroke starts. In the plasma ignition operation, immediately after the piston 23 passes the top dead center, the exhaust valve 28 is closed, and the exhaust stroke ends. Immediately after the exhaust stroke ends, the air fuel ratio control part 32 outputs an injection signal to the injector 29 to cause the injector 29 to inject fuel. The air fuel ratio control part 32 outputs to the injector 29, along with the injection signal, information indicative of the fuel injection amount that has been read from the control map for air fuel ratio. As a result thereof, the actual air fuel ratio of the air fuel mixture in the combustion chamber 10 becomes the value of the lean limit in the case of volume ignition of the air fuel mixture by the plasma (the plasma generated in the current combustion cycle).

Immediately after the piston 23 passes the bottom dead center, the intake valve 27 is closed, and the intake stroke ends. After the intake stroke ends, a compression stroke of compressing the air fuel mixture in the combustion chamber 10 starts. During the compression stroke, the plasma control unit 33 outputs a discharge signal to the pulse generator 36. As a result thereof, a high voltage pulse that has been boosted in the pulse generator 36 is outputted to the mixer circuit 38.

On the other hand, the plasma control part 33 outputs a radiation signal to the pulsed power supply of the electromagnetic wave oscillator 37. The plasma control part 33 outputs, along with the radiation signal, information indicative of the pulse width of the microwave to the pulsed power supply. As a result thereof, the pulsed power supply supplies power to the magnetron, and the magnetron outputs the microwave to the mixer circuit 38.

The mixer circuit 38 mixes the high voltage pulse outputted from the pulse generator 36 and the microwave outputted from the magnetron, and the mixed high voltage pulse and microwave are supplied to the discharge electrode 15a of the spark plug 15. As a result thereof, a spark discharge occurs due to the high voltage pulse between the discharge electrode 15a and a ground electrode 15b of the spark plug 15, and small scale plasma is generated. The small scale plasma is irradiated with the microwave from the discharge electrode 15a of the spark plug 15. The small scale plasma absorbs the energy of the microwave and expands. In the combustion chamber 10, the expanded plasma causes volume ignition of the air fuel mixture, and a combustion of the air fuel mixture starts. With this plasma, the lean limit of the air fuel mixture is adjusted to the value that maximizes the fuel consumption rate.

After the combustion of the air fuel mixture starts, the piston 23 is moved toward the bottom dead center by the expansion force of the combustion of the air fuel mixture. After the piston 23 passes a middle point of the stroke, before the piston 23 reaches the bottom dead center, the exhaust valve 28 is open, and the exhaust stroke starts. The exhaust stroke ends immediately after the intake stroke starts.

In the present embodiment, a radiation signal is outputted before the spark discharge occurs between the electrodes of the spark plug 15, and the microwave is radiated therefrom before the spark discharge occurs. The microwave is continuously radiated until after the spark discharge occurs. The microwave is radiated for an extremely short period of time. Each period of time of the microwave radiation is determined by the pulse width of the high voltage pulse outputted to the magnetron from the pulsed power supply. However, the timing of starting to output the radiation signal is not limited to timing before the spark discharge occurs between the electrodes of the spark plug 15. As long as the microwave radiation can start before the small scale plasma disappears, the timing of starting to output the radiation signal may be any timing even after the spark discharge occurs.

Effect of Embodiment

In the present embodiment, since, in the case of volume ignition of the air fuel mixture by the plasma, the range of air fuel ratio that allows stable ignition of the air fuel mixture differs depending on fuel type, the air fuel ratio of the air fuel mixture in the combustion chamber 10 is controlled according to the detected fuel type. Accordingly, it is possible to control the air fuel ratio of the air fuel mixture during the plasma ignition operation toward an optimal value independent of the fuel type.

Furthermore, according to the present embodiment, since the fuel consumption rate is used as a criterion for controlling the plasma input energy, the fuel consumption rate can be optimized, and at the same time, the plasma input energy can be prevented from increasing to the degree of being excessively larger than necessary. Accordingly, it is possible to reduce energy consumed in the internal combustion engine 20. Also, since the actual air fuel ratio is controlled to the lean limit, it is possible to suppress nitrogen oxide emission.

First Modified Example of Embodiment

In a first modified example, during the plasma ignition operation, the air fuel ratio is not controlled according to the detected fuel type, but only the plasma input energy is controlled according to the detected fuel type. The plasma control part 33 controls the plasma input energy so that the plasma input energy increases as the fuel becomes less ignitable. Accordingly, it is possible to appropriately ignite the air fuel mixture independent of the fuel type.

Other Embodiments

The above described embodiment may be configured as follows.

In the present embodiment described above, the plasma for volume ignition of the air fuel mixture may be generated by a dielectric barrier discharge or a corona discharge.

Furthermore, in the present embodiment described above, the nozzle 29a of the injector 29 may be open to the combustion chamber 10. In this case, fuel is injected into the combustion chamber 10 from the nozzle 29a of the injector 29, for example, during the intake stroke. As a result thereof, the air fuel mixture is generated in the combustion chamber 10.

Furthermore, in the present embodiment described above, the fuel type detection part 40 may determine fuels different in water content ratio as fuels of different types. For example, the fuel type detection part 40 detects water content ratio of hydrous ethanol and determines hydrous ethanol having water content ratio of X % and hydrous ethanol having water content ratio of Y % ($X \neq Y$) as different types of fuels. The air fuel ratio control part 32 controls the air fuel ratio of the air fuel mixture in the combustion chamber 10 according to the detected water content ratio with regard to hydrous ethanol. Meanwhile, the air fuel ratio control part 32 may control the plasma input energy according to the detected water content ratio with regard to hydrous ethanol.

Furthermore, in the present embodiment described above, the electromagnetic wave oscillator 37 repeatedly outputs microwave pulses at a predetermined duty cycle for each ignition period. In this case, the plasma control part 33 may change the duty cycle of the microwave pulses, thereby controlling the plasma input energy. Also, instead of changing the width of the microwave pulses, the plasma control part 33 may change the amplitude (peak power) of the microwave pulses, thereby controlling the plasma input energy.

INDUSTRIAL APPLICABILITY

The present invention is useful in relation to a control device that controls a plasma ignition operation for causing volume ignition of air fuel mixture by plasma in a combustion chamber of an internal combustion engine.

EXPLANATION OF REFERENCE NUMERALS

10 Combustion Chamber
20 Internal Combustion Engine
30 Control Device for Internal Combustion Engine
32 Air Fuel Ratio Control Part (Air Fuel Ratio Control Unit)
33 Plasma Control Part (Plasma Control Unit)
40 Fuel Type Detection Part (Fuel Type Detection Unit)

The invention claimed is:

1. A control device for an internal combustion engine, for controlling a plasma ignition operation to cause volume ignition of air fuel mixture by plasma in a combustion chamber of the internal combustion engine, comprising a fuel type detection unit that detects a type of fuel to be supplied to the combustion chamber, and
wherein the control device adjusts a state of the plasma or a state of the air fuel mixture in the combustion chamber according to the detected fuel type that has been detected by the fuel type detection unit during the plasma ignition operation.

2. The control device for an internal combustion engine according to claim 1, further comprising an air fuel ratio control unit that controls air fuel ratio of the air fuel mixture in the combustion chamber according to the detected fuel type during the plasma ignition operation.

3. The control device for an internal combustion engine according to claim 2, further comprising a plasma control unit that, during the plasma ignition operation, changes input energy for generating the plasma based on an operation state of the internal combustion engine, and adjusts an air fuel ratio of flammability limit of air fuel mixture to a value that maximizes fuel consumption rate in the operation state, wherein the air fuel ratio control unit controls the air fuel ratio of the air fuel mixture in the combustion chamber during the plasma ignition operation to the air fuel ratio of flammability limit of the air fuel mixture.

4. The control device for an internal combustion engine according to claim 1, further comprising a plasma control unit that changes input energy for generating the plasma according to the detected fuel type during the plasma ignition operation.

5. The control device for an internal combustion engine according to claim 4, wherein the internal combustion engine repeatedly radiates pulse-like electromagnetic waves at a predetermined duty cycle for each ignition period in the combustion chamber, thereby generating the plasma, while the plasma control unit changes the duty cycle according to the detected fuel type.

6. The control device for an internal combustion engine according to any one of claims 1 through 5,
wherein the fuel type detection unit detects fuels identical in principal components but different in water content ratio as different types of fuels.

7. A control device for an internal combustion engine, for controlling a plasma ignition operation for causing volume ignition of air fuel mixture by plasma in a combustion chamber of the internal combustion engine, comprising:
a plasma control unit that changes input energy for generating the plasma based on an operation state of the internal combustion engine, thereby adjusting an air fuel ratio of flammability limit of the air fuel mixture to a value that maximizes fuel consumption rate in the operation state, during the plasma ignition operation; and
an air fuel ratio control unit that controls an air fuel ratio of the air fuel mixture in the combustion chamber during the plasma ignition operation to the air fuel ratio of flammability limit, which is determined by the input energy for generating the plasma, of the air fuel mixture.

* * * * *